United States Patent

[11] 3,575,042

| [72] | Inventors | James F. Lovelace;<br>Dennis T. Cook, Niantic, Conn. |
|---|---|---|
| [21] | Appl. No. | 755,840 |
| [22] | Filed | Aug. 28, 1968 |
| [45] | Patented | Apr. 13, 1971 |
| [73] | Assignee | General Dynamics Corporation<br>New York, N.Y. |

[54] AUTOMATIC DIGITAL RECORDING WELD DEFECT DETECTOR
9 Claims, 4 Drawing Figs.

| [52] | U.S. Cl. | 73/67.8,<br>73/67.9 |
|---|---|---|
| [51] | Int. Cl. | G01n 24/04 |
| [50] | Field of Search | 73/67.5,<br>67.7, 67.8, 67.9 |

[56] References Cited
UNITED STATES PATENTS

| 2,989,864 | 6/1961 | Bamford | 73/67.8 |
| 3,178,933 | 4/1965 | Bloch et al. | 73/67.8 |
| 3,323,354 | 6/1967 | Daubresse et al. | 73/67.8 |
| 3,348,410 | 10/1967 | Henry | 73/67.8 |
| 3,481,186 | 12/1969 | Cellitt et al. | 73/67.9 |
| 3,482,435 | 12/1969 | Gunkel | 73/67.9 |

Primary Examiner—Richard C. Queisser
Assistant Examiner—Arthur E. Korkosz
Attorney—William C. Everett ABSTRACT: An automatic weld inspection system is described having an ultrasonic defect detector of the pulse reflection type. A search unit is mounted in a mechanism which moves it in incremental steps in directions parallel and perpendicular to the weld. An electronic control system which is responsive to the detection of a defect signal stops the mechanism movement of the scanner and electronically scans the weld in a direction running depth-wise through the weld. The electronic scanning system and the mechanical scanner provide digital readouts to a printer, so that the location of the defect and other characteristics thereof may be indicated.

Patented April 13, 1971

JAMES F. LOVELACE
DENNIS T. COOK
INVENTORS

Patented April 13, 1971
3,575,042
4 Sheets-Sheet 2
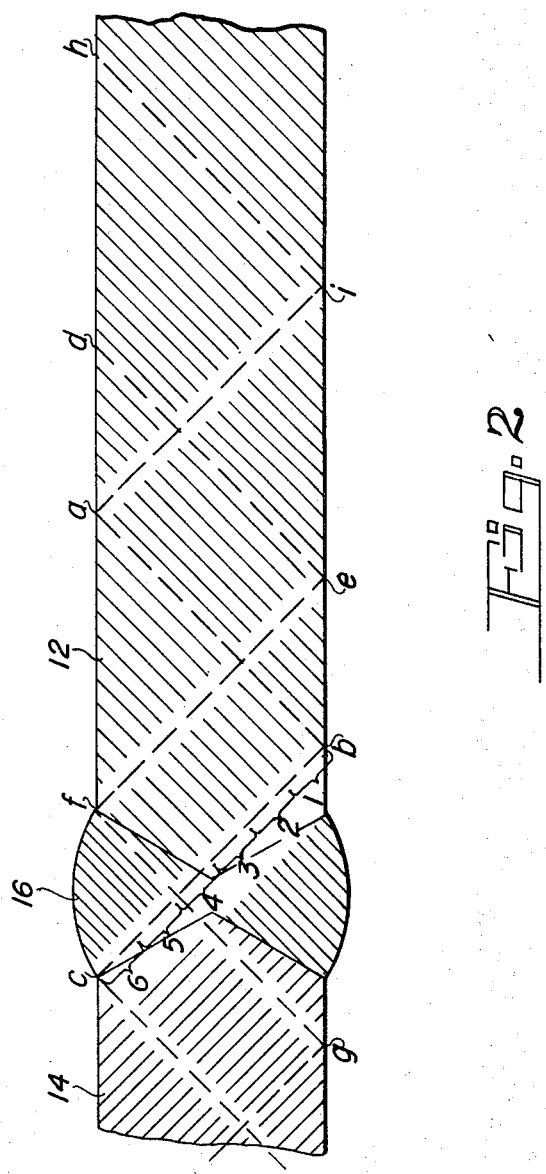
JAMES F. LOVELACE
DENNIS T. COOK
INVENTORS

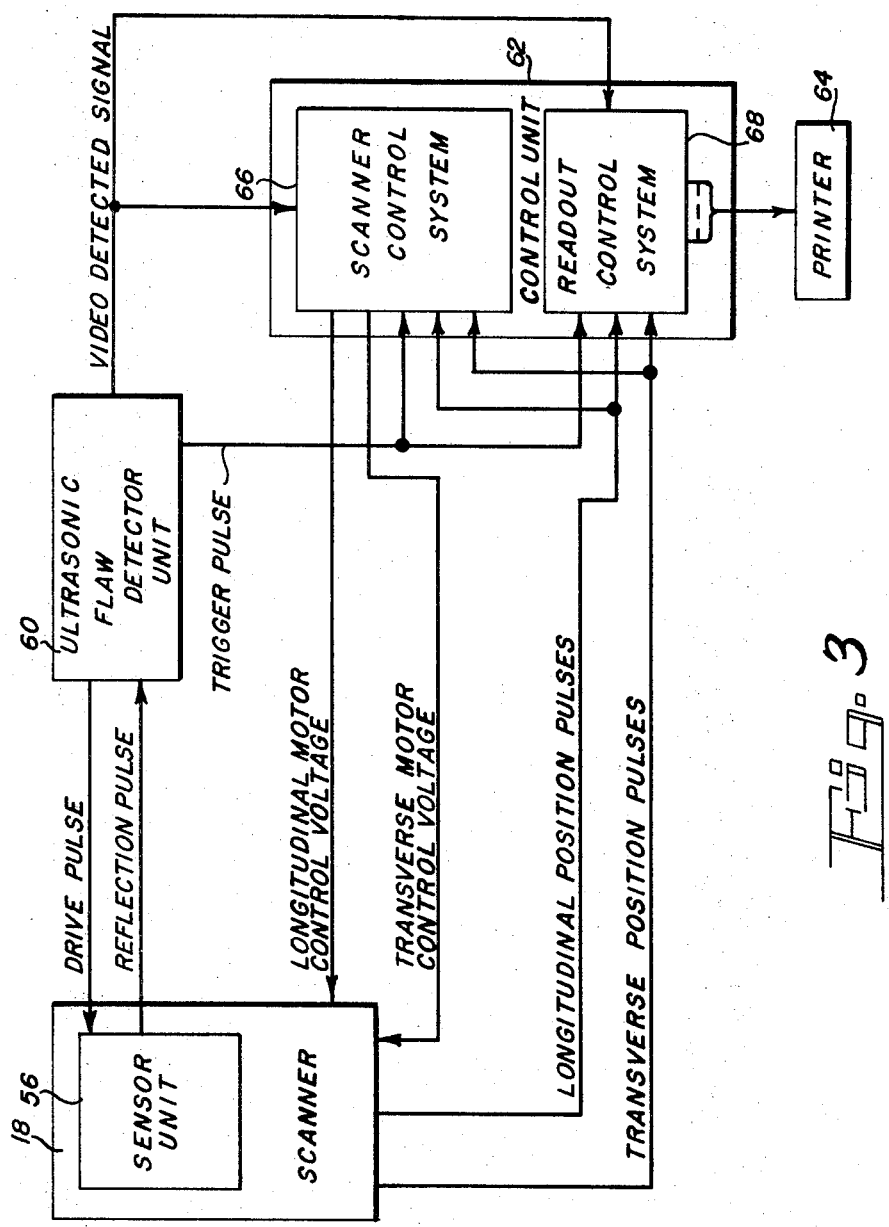

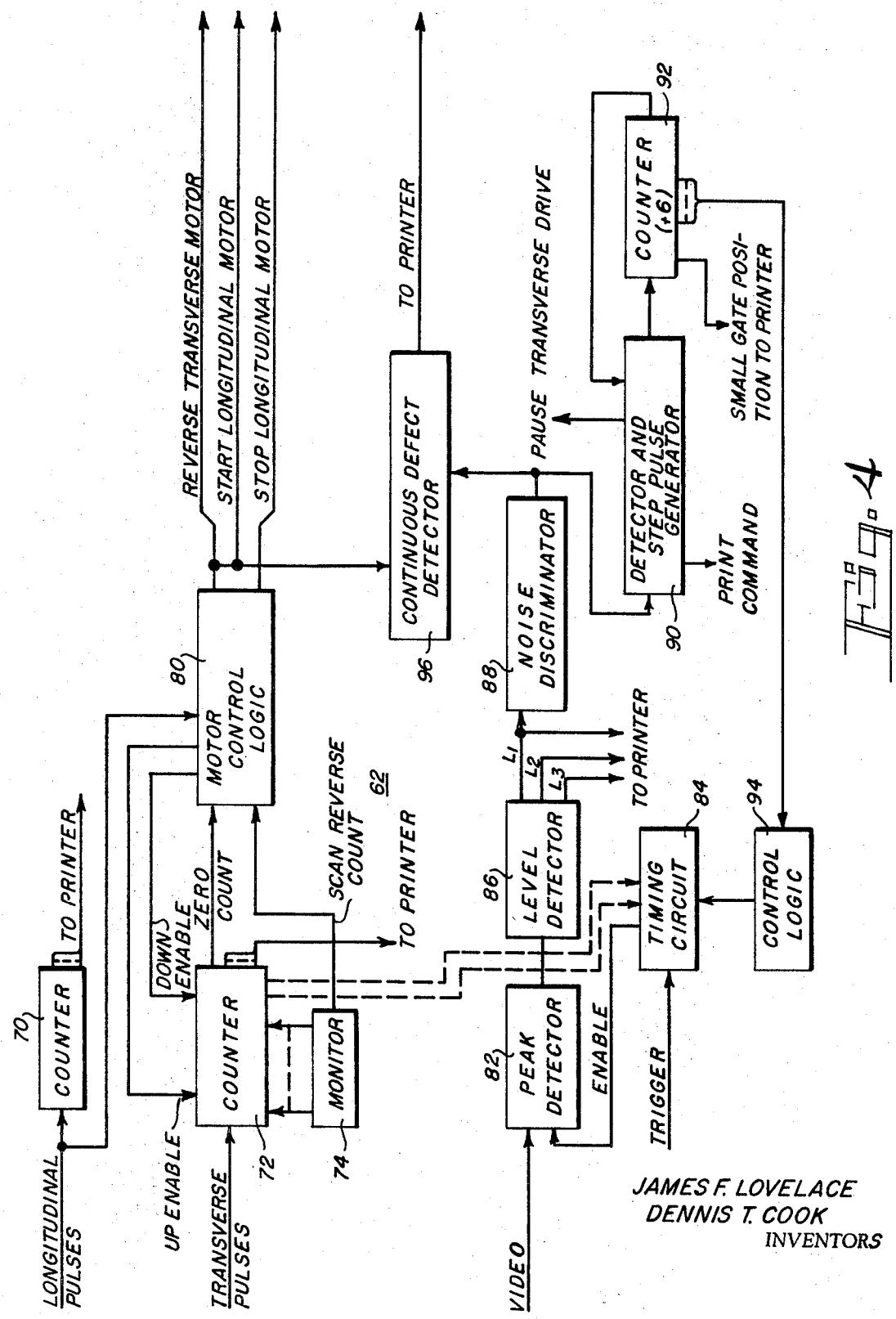

AUTOMATIC DIGITAL RECORDING WELD DEFECT DETECTOR

The Invention herein described was made in the course of a contract with the U.S. Navy.

The present invention relates to methods and systems for inspecting materials by means of the generation of pulses of ultrasonic energy and the reception of such pulses. More particularly, the invention relates to a system and method for the automatic ultrasonic inspection of welds which provides a permanent record of the inspection information.

Although the invention is especially suitable for use in inspecting butt welds between thick or heavy plates, such as may form the hull of a vessel, features of the invention are also generally useful in automatic ultrasonic inspection of materials and bodies of other types.

Automatic ultrasonic inspection systems which have been developed do not readily provide information respecting the necessary characteristics of a weld defect, such for example, as its location in three dimensions (viz., depth within the weld, as well as the position of the defect with reference to the surface of the weld). Depth information is normally derived manually. Alternatively, a complete display of the defect must be examined and analyzed by manual means in order to obtain a measurement of the depth of the defect. It is particularly desirable in examining thick materials, such as thick welds in the order of 1—3½ inch, that information as to precise location of the defect, particularly with respect to the depth thereof, be automatically provided. The displays associated with ultrasonic inspection equipments of known type have utilized cathode ray tube presentations. The information represented by such displays is not conveniently permanently recorded inasmuch as photographic techniques are required. It is desirable to provide information from the ultrasonic inspection of welds and other materials in the form of a permanent record which can compare favorably with information obtained from radiographic or x-ray testing.

Accordingly, it is an object of the present invention to provide an improved method of and system for automatically inspecting welds and other materials which provides all significant information respecting defects in such material including the location, length, orientation, shape, dimensions and extent of such defects.

It is a further object of the present invention to provide a system for automatic ultrasonic inspection of welds which is digital in operation and which can provide digital information as to the location and other characteristics of a weld defect which is uncovered.

It is a still further object of the present invention to provide a method and system for ultrasonic inspection of thick welds, such as butt welds between heavy plates and to make a record of each inspection which pinpoints such defects.

It is a still further object of the present invention to provide equipment which is readily portable for the automatic ultrasonic inspection of welds and other materials.

It is a still further object of the present invention to provide improved ultrasonic weld inspection equipment which is substantially universally positional with respect to a weld under test.

It is a still further object of the present invention to provide an improved method of and system for ultrasonic inspection of welds which provides information as to whether or not a defect is continuous or discontinuous and the length of any continuous defect.

Briefly described, ultrasonic weld inspection practiced in accordance with the invention utilizes a pulse echo ultrasonic search unit. This unit is moved adjacent the weld in incremental steps in a first direction along the weld. For each movement in the first direction, the search unit is moved a fixed distance toward or away from the weld. When a weld defect is detected, electronic scanning means are activated for inspecting the weld through the thickness thereof at the position where the defect was detected. Digital information is generated concurrently with the movement of the sensor unit and concurrently with the electronic scanning. This information reveals the position of the defect in all directions (viz., along the weld, transverse to the weld and through the thickness of the weld). All of this digital information is adapted to be permanently recorded, say with a digital printer.

The invention itself, both as to its organization and method of operation, as well as additional objects and advantages thereof will become more readily apparent from a reading of the following description in connection with the accompanying drawings in which:

FIG. 2 is a sectional view through a butt weld illustrating how information as to the location of a defect is derived in accordance with the invention;

FIG. 3 is a block diagram of a weld inspection system embodying the invention; and FIG. 4 is a more detailed block diagram of the ultrasonic weld inspection system shown in FIG. 3.

Figure 1:
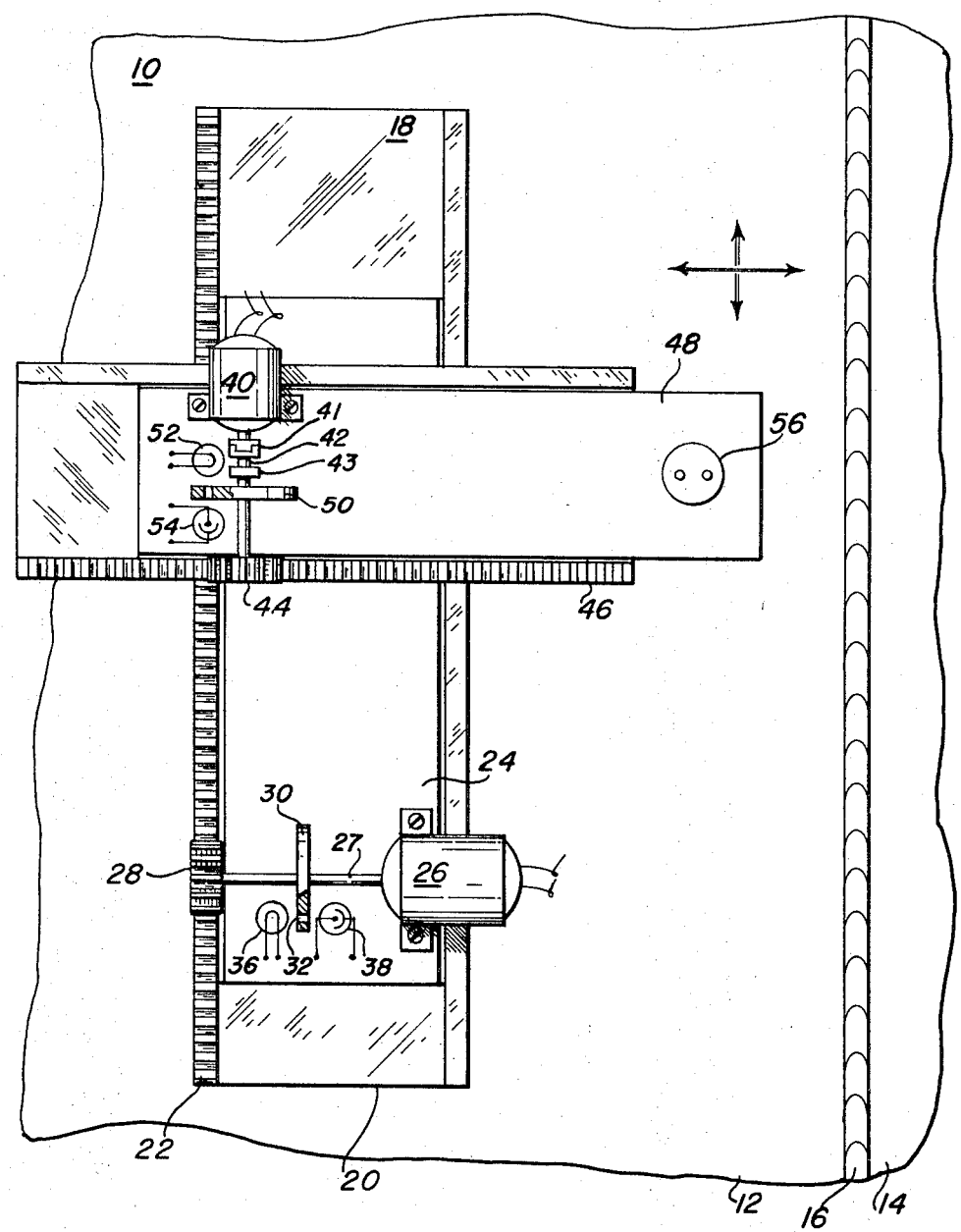
FIG. 1 is a diagrammatic plan view of an ultrasonic weld inspection system embodying the invention.

Referring now to FIG. 1, there is shown a portion of a welded section 10 consisting of a pair of plates 12 and 14 having a butt weld 16 which joins these plates together. The plates may be relatively thick, say 1–3½ inches. Notwithstanding the thickness of these plates, the automatic ultrasonic inspection system provided by the invention is capable of inspecting the weld for defects. The mechanical scanner portion 18 of the system includes a longitudinal support 20 having a rack gear 22 thereon. The support 20 also supports the entire scanner and may be positioned on the plate 12, near the weld which is being inspected, by means of magnetic holddown units, not shown. Thus, the scanner 18 may be mounted substantially universally with respect to the plates (viz., either in a horizontal position, as shown, or vertically against the sides of the plates 12 and 14, if they are in a vertical position). The rack 22 is referred to as the longitudinal track, inasmuch as it is disposed in a direction extending along the weld (i.e. longitudinally of the weld 16).

A carrier 24 is mounted upon the support 20 for movement in the longitudinal direction. Guides for preventing lateral meandering of the carrier 24 (not shown) may be provided. A longitudinal electric motor 26 is secured to the carrier 24. The shaft 27 of the motor carries a gear 28 at the end thereof. Thus, as the motor turns, the carrier 24 will move in a longitudinal direction with respect to the support. The shaft 27 also carries a disc 30 which rotates therewith. The disc 30 has a plurality of apertures 32 circumferentially thereabout. A lamp 36 and a photoelectric detector 38 are provided on opposite sides of the disc. The apertures 32 are so spaced that an electrical pulse is electro-optically derived each time the carrier 24 moves a predetermined increment or step, say one-eighth inch. These pulses are used to control the motion of the scanning mechanism 18, as will be explained in greater detail hereinafter.

The carrier 24 also supports a transverse electric motor 40. The shaft 42 of this motor is connected through an electromagnetic clutch 41 and brake 43 to gear 44 which engages a rack gear 46 on a plate 48 which is disposed perpendicularly to the carrier 24. A guide (not shown) is mounted on the carrier 24 which supports the plate 48 so that the plate moves with the carrier 24 and is prevented from meandering. The rack 46 is referred to as the transverse track, inasmuch as it extends and it is moveable in a transverse direction which is, in the illustrated case, perpendicular to the weld 16. The shaft 42 carries an apertured disc 50 similar to the disc 30. A lamp 52 and a photoelectric detector 54 are disposed on opposite sides of the disc and derive pulses, each upon a certain increment or step, say one-eighth inch, of motion of the transverse track 46 in the transverse direction.

The plate 48 carries an ultrasonic search unit 56 to which ultrasonic electrical pulses are applied. These pulses are transmitted by a transducer at the end of the search unit into the plate 12 and thence through the weld 16. The reflected pulses are derived by the search unit transducer and translated into electrical signals which correspond to the detection of the discontinuity in the weld indicative of a defect therein. The amplitude of the reflected signal which is in the form of a pulse, is characteristic of the size of the defect. While a single search unit 56 is shown, a double search unit having separate transducers for transmitting pulses ultrasonically into the weld and receiving pulses may be used. For further information respecting the search unit and the pulse reflection-detection technique of ultrasonic inspection, reference may be had to the Non-Destructive Testing Handbook by Robert C. McMaster, The Ronald Press Company, New York 1963, volume II, pages 43.28 et seq.

A diagrammatic presentation of the mechanical scanner has been provided in order to clarify the illustration and the exposition of the invention. In practice, other mechanisms may be used to provide for stepwise longitudinal and transverse movements of the search unit.

The practice of the invention will be more apparent from FIG. 2 which illustrates the ray paths of the ultrasonic pulses which are reflected from the weld area. It will be assumed that the search unit 56 is initially at position $a$. That position may be taken to be the reference position at the start of each transverse scanning sequence. Ultrasonic pulses are transmitted at a rate determined by the ultrasonic flaw detector, at say 500 to 1000 pulses per second. These pulses travel along a ray path such as $abc$ or $defg$ being reflected at each surface of the plates and passing through the weld on some part of the ray path. Normally the search unit moves continuously along the surface of the plate while the pulses are being transmitted. Timing circuits connected to the ultrasonic flaw detector permit the monitoring of reflected signals occurring during the transit of the pulses through the weld. Such times would correspond, for example, to ray paths $bc$ or $fg$. Specifically, while the search unit moves from point $a$ to point $d$ the timing circuits allow only reflected signals occurring during the time interval equal to that of ray path $bc$ to monitor for possible recording. When the search unit reaches point $d$ the timing circuits are conditioned to monitor only reflected signals occurring during the time interval equal to that of ray path $fg$. Upon reaching position $h$ the motion transverse to the weld is halted and the unit is moved an increment along the weld. Then the motion of the search unit and the conditioning of the timing circuits described above is executed in the reverse order until the search unit is again at position $a$ relative to the edge of the weld. At any time during this scanning sequence a reflection from a defect of recordable size may occur. When this happens the mechanical scanner 18 is stopped by opening the electromagnetic clutch and setting the electromagnetic brake. The system is simultaneously conditioned into an electronic scanning mode of operation. The timing circuit which monitors the time intervals corresponding to ray paths such as $bc$ or $fg$ are conditioned such that the successive, adjacent sections of the ray path, indicated in the drawing as sections 1, 2, 3, 4, 5, and 6, are monitored. A reflected signal occurring in any of these sections and having a sufficient amplitude will cause the printer to print the address or location of the section in which it occurred. This information and the information as to the location of the longitudinal and transverse position (in this case position $a$) is also printed. Similarly, a measurement of the amplitude of the detected pulse may also be quantized and read out to the printer.

Inasmuch as the electronic scanning operation occurs only for those positions of the scanning head where a defect is located, the scanning and inspection of a weld may proceed rapidly. A very fine or very coarse record of the weld may be provided. For thick butt welds, transverse incrementals of one-eighth inch between position $a$ and $h$ have been found suitable. Longitudinal incrementals of one half inch have also been found suitable.

FIG. 3 shows the mechanical scanner 18 and the sensor unit 56. Ultrasonic drive pulses for exciting the sensor unit to transmit pulses into the weld are generated in the ultrasonic flaw detector unit 60. The reflected pulses from the sensor 56 are also applied to this unit 60. The unit 60 provides a video signal which includes pulses corresponding to the detection of a defect. In addition, trigger pulses are provided simultaneously with the drive pulses so as to provide a reference from which the transit times of reflected pulses over the particular portions of the ray paths of interest may be determined. Reference may be had to the above-mentioned Handbook for further information as to the flaw detector unit 60.

The scanner 18 also provides pulses from the photo detector 38 adjacent to the longitudinal motor which indicates the position of the sensor unit in the longitudinal direction. Similarly, pulses are provided from the photodetector 54 adjacent to the transverse motor 40 which provides information as to the location of the sensor unit in a direction transverse to the weld (viz. the distance from the sensor unit to the weld along a line from the sensor unit perpendicular to the weld). The video detected signal and the longitudinal and transverse position pulses, as well as the trigger pulses, are applied to a control unit 62 which controls the movement of the scanner and the electronic scanning operations, as well as the read out of the positional and defect signals to an indicating device, such as a printer 64.

The control unit has two integrated parts; namely, a scanner control system 66 and a readout control system 68. The scanner control system provides control voltages to the longitudinal and transverse motors in the scanner 18. Logic circuits in the scanner control system 66 cause the transverse and longitudinal motors to move the search unit in the zigzag path described. In the event a defect is detected, the scanner control system 66 initiates the electronic scanning operation whereby incremental sections through the thickness or depth of the weld are inspected. Information as to these sections is provided to the readout control system, which thereupon provides digital information to the printer 64 which may read it out. Desirably, the printer has a separate readout channel or display for the longitudinal position and the transverse position of the sensor 56 as well as for the location of the section along the thickness of the weld subject to electronic scanning. Display channels are also provided for the quantized amplitude of the detected signal. The printer may be a digital printer of the type now available. The printer manufactured by Hewlett Packard of Palo Alto, California, model 5050A is suitable. The practice of the invention therefore digitizes the weld volume, that is it breaks the weld volume into discrete sections and indicates the location or address of the section at which a defect is observed. The printer 64 makes a permanent record of these defects automatically. Other means are included in the readout control system for detecting whether or not defects occur in adjacent sequences of transverse scans through successive longitudinal sections of the weld (viz. when the sensor unit is in successive longitudinal increments or positions). This information indicates whether or not the defect is continuous or discontinuous in a longitudinal direction and the extent of any continuous defect. This information is read out onto a separate channel of the printer.

A more detailed block diagram of the control unit 62 is shown in FIG. 4. The longitudinal position pulses from the scanner are read into a counter 70. The count stored in the counter 70 may be applied to its corresponding printer channel and read out. The transverse position pulses are read into an up-down counter 72. When the counter reads zero, motor control logic circuits 80 are conditioned to enable the counter to count up. When the counter reaches the number set on the monitor 74, transverse motion stops and the longitudinal motor is started. Receipt of a predetermined number of longitudinal pulses stops the longitudinal motor. The counter is enabled to count down and the transverse motor is reversed so as to move the search unit back toward zero. At zero the search unit is again indexed along the weld. When the counter 72 counts to the number set as the shift point (within monitor 74), the command to enable the receipt of long transit time reflected pulses (along path $fg$) is produced if the transverse motor is moving the sensor unit in the direction from position *a* to position *h*. Of course, if the sensor unit is moving in the reverse direction, i.e. from *h* to *a*, a command is produced to enable the reflected pulses received during the short transit time (along the shorter ray paths *bc*) as shown in FIG. 2.

The video signal from the flaw detector unit 60 is applied to a peak detector 82. The peak detector contains a gate circuit at its input which enables the detection of video signals during periods of time controlled by a timing circuit 84. The output of the peak detector is applied to a level detector 86 which quantizes the output into signals which may appear on one or more of three output lines $L_1$, $L_2$ and $L_3$. To this end, the level detector may include threshold circuits which provide an output on line $L_1$ if the detected video signal is above a lower threshold level. Outputs are produced on lines $L_2$ and $L_3$ if the detected amplitudes are of successively higher levels. These level or amplitude indicating signals are applied to the printer for readout.

The output indicating the lower level is applied to a noise discriminator circuit 88. The noise discriminator includes a one-way integrator circuit. This circuit will provide an output level only if the lowermost level signal is maintained for a given time duration. Noise pulses which normally are of shorter duration are, therefore, inhibited.

The output of the noise discriminator 88 is therefore a level representing the detection of a defect. This level is applied to a detector and step pulse generator circuit 90. The step pulse generator includes an oscillator, say of the unijunction type, which produces a sequence of pulses upon an output from the noise discriminator 88. When a defect is detected, the detector and step pulse generator 90 also provides a command to the clutch and brake to prevent the search unit from moving so that the electronic scanning operation may be completed before the scanner moves on. The pulses from generator circuit 90 are applied to a counter 92. When the counter reaches a count of 6, the step pulse generator 90 is inhibited. The counter stages are connected to a control logic network 94 containing gates which provide outputs to the timing circuit 84 corresponding to each of the 6 counts stored in the counter. Upon receipt of a trigger pulse, the timing circuit produces a gate pulse to enable the peak detector to pass a video signal during a predetermined period of time corresponding to a different section of the weld (viz. sections 1 through 6 as shown in FIG. 2). A count of one in the counter will therefore enable the peak detector to inspect section 1. A count of 2 in the counter 92 will generate an enable pulse properly timed to inspect section 2. Similarly, pulses properly timed to inspect sections 3 to 6 will be successively produced. The counter also provides pulses to a channel in the printer which indicates which section is under test. Thus, by examining the level of the signals in each section, the shape of the defect as well as its location will be indicated by the printout from the printer.

The output pulses from the noise discriminator are also applied to a continuous defect detector 96. This detector includes another counter which is enabled to count longitudinal steps of the scanner unit. To this end, each time a start pulse is applied to the longitudinal motor, the counter in the detector 96 is advanced one count. The counter counts up to two longitudinal increments. When the printer operates, the counter is reset to zero immediately following the print cycle. Therefore, the only way for the counter to register two counts is by the scanner indexing twice along the weld without an intervening print cycle. When the counter reads two, an appropriate symbol is printed on the next print cycle.

From the foregoing description it will be apparent that there has been provided an improved automatic ultrasonic inspection system, as well as an improved method for inspecting materials ultrasonically. While the system has been described in connection with an inspection of a weld, it will be appreciated that the system and the method may be applied to the inspection of other materials by the ultrasonic pulse reflection technique. The system has been simplified in the interest of explaining the invention concisely. Modifications and variations, within the scope of the invention, will undoubtedly suggest themselves to those skilled in the art. Accordingly, the foregoing description should be taken merely as illustrative and not in any limiting sense.

We claim:
1. An ultrasonic inspection system comprising:
   a. means for mechanically scanning a region under test with an ultrasonic signal in a first and in a second direction, one of which directions is along and the other of which is transverse to the region, said means having:
      i. a sensor unit for receiving said ultrasonic signals;
      ii. first means for moving said sensor unit in incremental steps in a direction substantially parallel to said region, including a carrier, a first motor mounted on said carrier, and a member movable with said carrier and for supporting said sensor unit;
      iii. second means for moving said sensor unit in said second direction which is transverse to said region, including a second motor, a plate carrying said sensor unit mounted on said member and adapted to be driven by said second motor in said transverse direction; and
      iv. means for controlling said first and second moving means so that said second means executes said movements in said second direction after each of said movements in said first direction;
   b. means responsive to the detection of a defect in the region to scan said region with said ultrasonic signal in incremental steps in a third direction which is transverse to both said first and second directions;
   c. means for indicating the location of said incremental steps in each of said first, second, and third directions at which said defect is detected;
   d. means for providing first pulses, each upon an incremental step of movement in said first direction;
   e. means for providing second pulses, each upon a successive step of movement of said sensor unit in said second direction; and
   f. means including counters responsive to said pulses for controlling said motors to move said sensor units first in said first direction and then in said second direction.
2. An ultrasonic inspection system comprising:
   a. means for mechanically scanning a region under test with an ultrasonic signal in a first and in a second direction, one of which directions is along and the other of which is transverse to the region;
   b. means responsive to the detection of a defect in the region to scan said region with said ultrasonic signal in incremental steps in a third direction which is transverse to both said first and said second directions, including:
      i. gate means for passing a reflected ultrasonic signal when enabled; and
      ii. means for enabling said gate circuit during successive intervals of time, each corresponding to a different section of said region under test; and
   c. means for indicating the location of said incremental steps in each of said first, second, and third directions at which said defect is detected.
3. The invention as set forth in claim 2 wherein said enabling means includes means responsive to a defect signal for generating a plurality of pulses, a counter for counting said pulses and a timing circuit for enabling said gate means during successive periods of time, each corresponding to a different count in said counter.
4. The invention as set forth in claim 3 including means responsive to said defect signal for quantizing said defect signal into a plurality of outputs in accordance with the amplitude thereof and means included in said indicating means for displaying each of said quantized levels upon occurrence thereof.
5. An ultrasonic inspection system comprising:

a. means for mechanically scanning a region under test with an ultrasonic signal in a first and in a second direction, one of which directions is along and the other of which is transverse to the region;

b. means responsive to the detection of a defect in the region to scan said region with said ultrasonic signal in incremental steps in a third direction which is transverse to both said first and said second directions;

c. means for indicating the location of said incremental steps in each of said first, second and third directions at which said defect is detected; and d. means responsive to successive movements of said scanning means in said first direction and to the detection of defect signals for providing an output when defect signals are detected following a plurality of successive steps of movement in said first direction.

6. The method of detecting defects in welds with the aid of an ultrasonic pulse generating and a reflected ultrasonic pulse receiving device comprising the steps of:

a. moving said device adjacent said weld incrementally in a first direction along said weld;

b. moving said device back and forth in a second direction transverse to said first direction over a distance for each of said incremental movements in said first direction;

c. gating reflected pulses received by said device during successive incrementals of time during movements in said second direction; and d. indicating the location of said device when a reflected pulse is gated and the incremental of time during which said gated pulse occurs whereby to identify a defect in said weld and the location thereof.

7. The invention as set forth in claim 6 including the step of detecting a reflected pulse indicative of a defect, stopping said incremental movement in said first and second directions, and thereafter performing said step of gating said reflected pulses received by said device.

8. The invention as set forth in claim 6 including the steps of quantizing the amplitude of said reflected pulses indicative of a defect into a plurality of levels, and recording said levels.

9. The invention as set forth in claim 6 including the step of indicating the reception of reflected pulses indicative of a defect between successive said incremental steps in said first direction thereby indicating whether or not a defect is continuous.